United States Patent [19]
Brodsky et al.

[11] Patent Number: 5,991,536
[45] Date of Patent: *Nov. 23, 1999

[54] OBJECT-ORIENTED TOOL FOR REGISTERING OBJECTS FOR OBSERVATION AND CAUSING NOTIFICATIONS TO BE MADE IN THE EVENT CHANGES ARE MADE TO AN OBJECT WHICH IS BEING OBSERVED

[75] Inventors: Stephen Andrew Brodsky, Los Gatos; Timothy James Grose, San Jose, both of Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/747,417

[22] Filed: Nov. 12, 1996

[51] Int. Cl.$^6$ ........................................................ G06F 9/44
[52] U.S. Cl. .......................... 395/704; 395/701; 395/712
[58] Field of Search .................................... 395/703, 650, 395/683, 700, 704, 701, 702, 705, 706, 707, 708, 709, 710, 712

[56] References Cited

U.S. PATENT DOCUMENTS

| | | |
|---|---|---|
| 4,845,665 | 7/1989 | Heath et al. . |
| 5,206,951 | 4/1993 | Khoyi et al. ............................ 395/701 |
| 5,247,651 | 9/1993 | Clarisse . |
| 5,257,363 | 10/1993 | Shapiro et al. . |
| 5,303,379 | 4/1994 | Khoyi et al. ............................ 395/703 |
| 5,315,709 | 5/1994 | Alston, Jr. et al. . |
| 5,325,533 | 6/1994 | McInerney et al. . |
| 5,390,320 | 2/1995 | Smithline . |
| 5,390,330 | 2/1995 | Talati . |
| 5,396,630 | 3/1995 | Banda et al. ............................ 395/703 |
| 5,421,015 | 5/1995 | Khoyi et al. . |
| 5,437,037 | 7/1995 | Furuichi . |
| 5,475,817 | 12/1995 | Waldo .................................... 395/701 |
| 5,515,497 | 5/1996 | Itri et al. . |
| 5,528,503 | 6/1996 | Moore et al. . |
| 5,537,630 | 7/1996 | Berry et al. . |
| 5,542,040 | 7/1996 | Chang et al. . |
| 5,555,365 | 9/1996 | Selby et al. . |
| 5,557,518 | 9/1996 | Rosen . |
| 5,732,271 | 3/1998 | Berry ..................................... 395/683 |

OTHER PUBLICATIONS

Object–Oriented Modeling and Design Rumbaugh et al. inside covers pp. 1–10, 474, Chapters 5 and 10, 1990.

Object Oriented Anaysis and Design with Applications, Booch inside covers Chapters 3, 1994.

Distributed Object Based Programming Systems R. Chin et al., 1991.

Citrin, Wayne, et al., "Using Formalized Temporal Message–flow Diagrams," *Software–Practice and Experience*, vol. 25, No. 12, pp. 1367–1401, Dec. 1995.

Coats, Mark, et al., "Constructing Operational Specifications," *Dr. Dobb's Journal of Software Tools for Professional Programmer*, vol. 20, No. 6, pp. 18–33, Jun. 1995.

De Man, Josef, et al., "Towards a formal Semantics of Message Sequence Charts", *SDL 93 Using Objects. Proceedings of the Sixth SDL Forum 1993*, pp. 157–165, 1993.

De Man, Jozef, et al., "Developing Formal Specifications with Message Sequence Charts", XIV International Switching Symposium, vol. 2, pp. 134–137, Oct. 1992.

Ek, Anders, "Verifying Message Sequence Charts with the SDT Validator," *SDL '93, Using Objects. Proceedings of the Sixth SDL Forum 1993*, pp. 237–249.

Grabowski, Jens, et al., "The Standardization of Message Sequence Charts," *Proceedings 1993: Software Engineering Standards Symposium*, pp. 48–63, 1993.

Graubmann, Peter, et al., "Towards a Petri Net Based Semantics Definition for Message Sequence Charts," *SDL 93: Using Objects*, pp. 179–190, 1993.

Hadzilacos, Thanasis, et al., "Transaction Synchronisation in Object Bases", *Journal of Computer and System Sciences*, vol. 43, pp. 2–24, 1991.

Ito, Atsushi, et al., "Transformation Technique Between Specification in SDL and Specification in Message Sequence Charts for Designing Protocol Specifications," *Supercomm/ICC '92: Discovering a New World of Communications*, IEEE vol. 1, pp. 0442–0447, 1992.

Ladkin, Peter B., et al., "What do Message Sequence Charts Mean?", *IFIP Trans., C. Commun. Syst.*, vol. C, No. 22, pp. 301–316, 1994.

Ladkin, Peter B., et al., "Interpreting Message Flow Graphs," *Formal Aspects of Computing 1995*, vol. 7, No. 5, pp. 473–509, 1995.

Mauw, S., et al., "An Algebraic Semantics of Basic Message Sequence Charts," *The Computer Journal*, vol. 37, No. 4, pp. 269–277, 1994.

Mauw, S., et al., "A Formal Semantics of Synchronous Interworkings," *SDL '93 using Objects: Proceedings of the Sixth SDL Forum 1993*, pp. 167–178.

Moriyasu, Kenji, et al., "A Method of Applying Message Sequence Chart Specifications for Services with Variant Process Structure," *Electronics and Communications in Japan*, Part 1, vol. 78, No. 9, pp. 12–24, 1995.

Okamoto, Mitsuhiro, et al., "A Verification Scheme for Service Specifications Described by Information Sequence Charts," *IEICE Trans. Commun.*, vol. E75–B, No. 10, pp. 978–985, Oct. 1992.

Thrampoulidis, K.X., et al., "Object Interaction Diagram: A New Technique in Object–oriented Analysis and Design," *Journal of Object–Oriented Programming*, vol. 8, No. 3, pp. 25–32, Jun. 1995.

*Primary Examiner*—Tariq R. Hafiz
*Assistant Examiner*—Todd Ingberg
*Attorney, Agent, or Firm*—Gates & Cooper

[57] ABSTRACT

The present invention discloses a method, apparatus, and article of manufacture for notification in an object-oriented system. The system includes observed objects in an object hierarchy, a notification manager, and observer objects. The notification manager determines when a change is made to one of the observed objects in the object hierarchy and then notifies an associated observer object of the change.

22 Claims, 7 Drawing Sheets

OBJECT-ORIENTED TOOL FOR REGISTERING OBJECTS FOR OBSERVATION AND CAUSING NOTIFICATIONS TO BE MADE IN THE EVENT CHANGES ARE MADE TO AN OBJECT WHICH IS BEING OBSERVED

CROSS-REFERENCE TO RELATED APPLICATIONS

This application is related to the following co-pending and commonly-assigned patent applications:

Application Ser. No. 08/747,415, entitled "METHOD FOR SYNCHRONIZING CLASS, METHODS, ATTRIBUTES AND OBJECT PROPERTIES ACROSS AN OBJECT-ORIENTED SYSTEM," filed on same date herewith, by Stephen A. Brodsky, Timothy J. Grose and Roni Korenshtein Application Ser. No. 08/747,414, entitled "LAYOUT METHOD FOR ARC-DOMINATED LABELLED GRAPHS," filed on same date herewith, by Subrata Mitra and Dipayan Gangopadhyay Application Ser. No. 08/747,416, entitled "MULTI-OBJECT VIEWS IN AN OBJECT MODELING TOOL," filed on same date herewith, by Roni Korenshtein Application Ser. No. 08/747,057, entitled "INTERACTIVE MODELING AGENT FOR AN OBJECT-ORIENTED SYSTEM," filed on same date herewith, by Stephen A. Brodsky and Rebecca Mei-Har Lau Application Ser. No. 08/747,058, entitled "EXECUTION ENGINE IN AN OBJECT MODELING TOOL," filed on same date herewith, by Stephen A. Brodsky, Gary C. Doney, Dipayan Panwar, and Subrata Mitra all of which applications are incorporated by reference herein.

BACKGROUND OF THE INVENTION

1. Field of the Invention.

This invention relates generally to object-oriented systems, and in particular to a notification system for object-oriented systems.

2. Description of Related Art.

In object-oriented systems, there is often a need to modify classes, objects, attributes, etc., and to notify one or more observer objects, such as views or windows in a user interface, of the modification. However, there is a problem in notifying the observer objects to update them to reflect the changes in observed objects. For example, observer objects may receive notifications of changes before all processing has completed, causing the observer objects to issue new requests from premature notifications and causing a potentially dangerous re-entrant situation. Further, the observed objects may have to be aware of and explicitly update the observer objects. Thus, there is a need in the art for a notification system that issues notifications after all processing in the object-oriented systems has been completed, bypassing the re-entrant problem.

SUMMARY OF THE INVENTION

To overcome the limitations in the prior art described above, and to overcome other limitations that will become apparent upon reading and understanding the present specification, the present invention discloses a method, apparatus, and article of manufacture for notification in an object-oriented system. The system includes observed objects in an object hierarchy, a notification manager, and observer objects. The notification manager determines when a change is made to one of the observed objects in the object hierarchy and then notifies an associated observer object of the change.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention comprises an object-oriented tool for modeling an application. Using the present invention, a user can interactively develop and validate a model for a specified application by visually representing classes, objects, messages, etc., in the application and the way they interact. The present invention also allows a user to execute the model to simulate processing by the application.

The present invention integrates the best of two major schools of current object-oriented modeling techniques, including those emphasizing structural modeling, such as Rumbaugh's object hierarchying technique (OMT) and the Booch method, as well as those starting with modeling of scenario-based behavior (such as object behavior analysis). As a result of using this object-oriented tool to model an application or system, the user can generate a set of definitions or classes representing the structure and behavior of the application, as well as documentation for the model.

Using the present invention, a user develops a model of an application by defining what the application will do and how the application will be implemented. Classes, objects, and scenarios are fundamental in such modeling techniques. The class defines the structure (attributes and relationships) and behavior for an entity (called an instance or object). An instance or object is an entity that takes its structure and behavior from its class. A scenario is a sequence of messages among objects.

Generally, when working with objects, classes and scenarios in the modeling tool of the present invention, the user performs a number of different actions, including creating classes and objects, creating scenarios, running the model, adding attributes, defining relationships, defining operations, adding states, and writing methods. Many of these actions are iterative.

Hardware Environment

Figure 1:
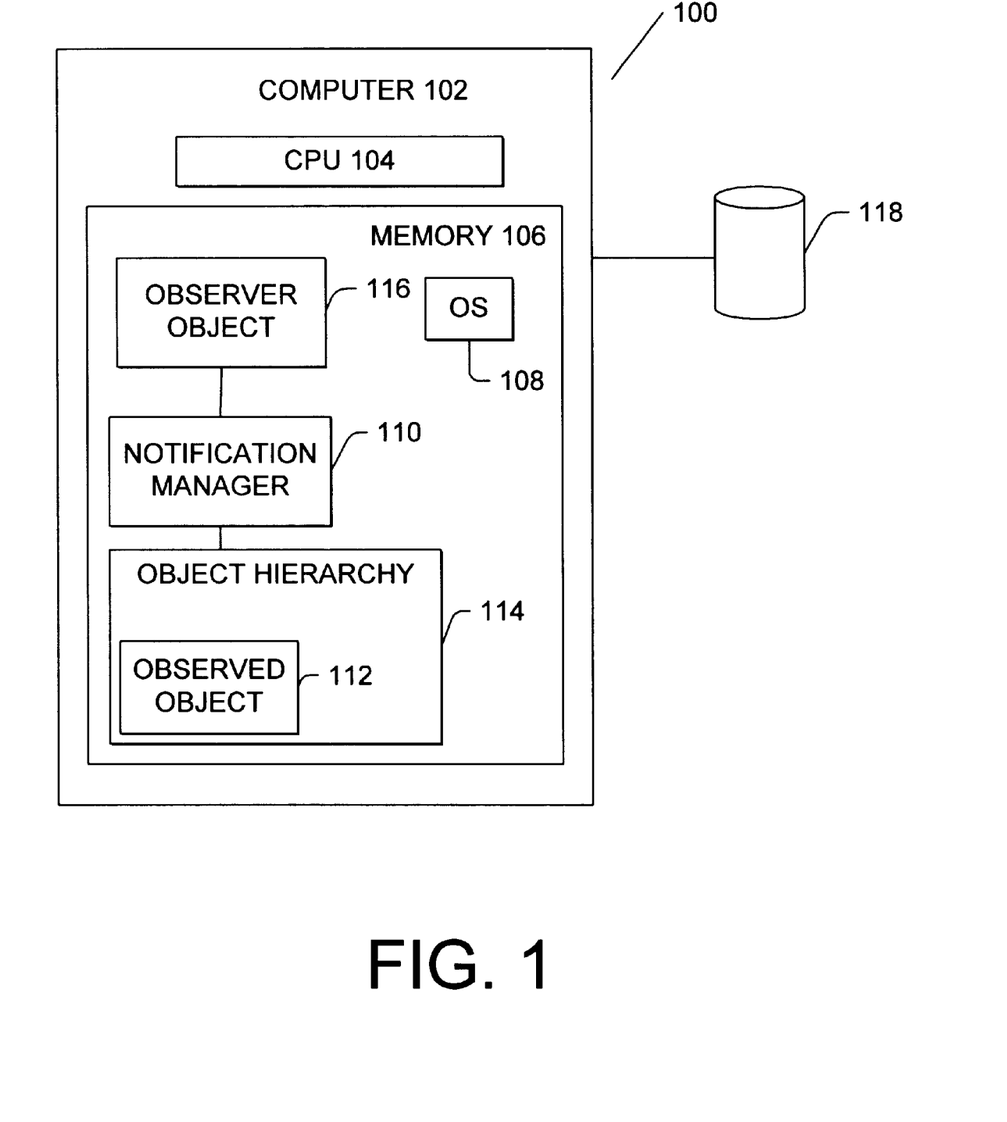
FIG. 1 illustrates an exemplary computer system that could be used to implement the present invention.

FIG. 1 illustrates an exemplary computer system 100 that could be used to implement the present invention. The computer 102 comprises a processor 104 and random access memory (RAM) 106. The computer 102 may be to coupled to other devices, such as a monitor, a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106. The present invention is preferably implemented using one or more data structures and computer programs operating under the control of the operating system 108. More specifically, the present invention includes a notification manager 110, observed objects 112, an object hierarchy 114, and observer objects 116. The object hierarchy 114 includes the observed objects 112, and when a change is made to an observed object 112, generally by the user, this change is reflected in the object hierarchy 114. The change is also communicated to the notification manager 110, which in turn notifies the observer object 116. The observer object 116 can also access the object hierarchy 114 via the notification manager 110 to make such modifications itself.

In the preferred embodiment, the operating system 108, the notification manager 110, the observed objects 112, the object hierarchy 114, and the observer objects 116 are all tangibly embodied in a computer-readable medium, e.g., data storage device 118, which could include one or more fixed or removable data storage devices, such as a removable cartridge drive, floppy disc drive, hard drive, CD-ROM drive, tape drive, etc. Further, the operating system 108, the notification manager 110, the observed objects 112, the object hierarchy 114, and the observer objects 116 are all comprised of instructions which, when read and executed by the computer 102, causes the computer 102 to perform the steps necessary to implement and/or use the present invention. Of course, those skilled in the art will recognize many modifications may be made to this configuration without departing from the scope of the present invention.

Notification Manager

In the present invention, the notification manager 110 notifies the observer objects 116 of changes made to the observed objects 112 in the object hierarchy 114, thereby ensuring that the observer object 114 has an up-to-date view of the observed objects 112 in the object hierarchy 114. A typical observer object 116 is a user interface object, such as a view or window displayed on a monitor attached to the computer 102.

Figure 2:
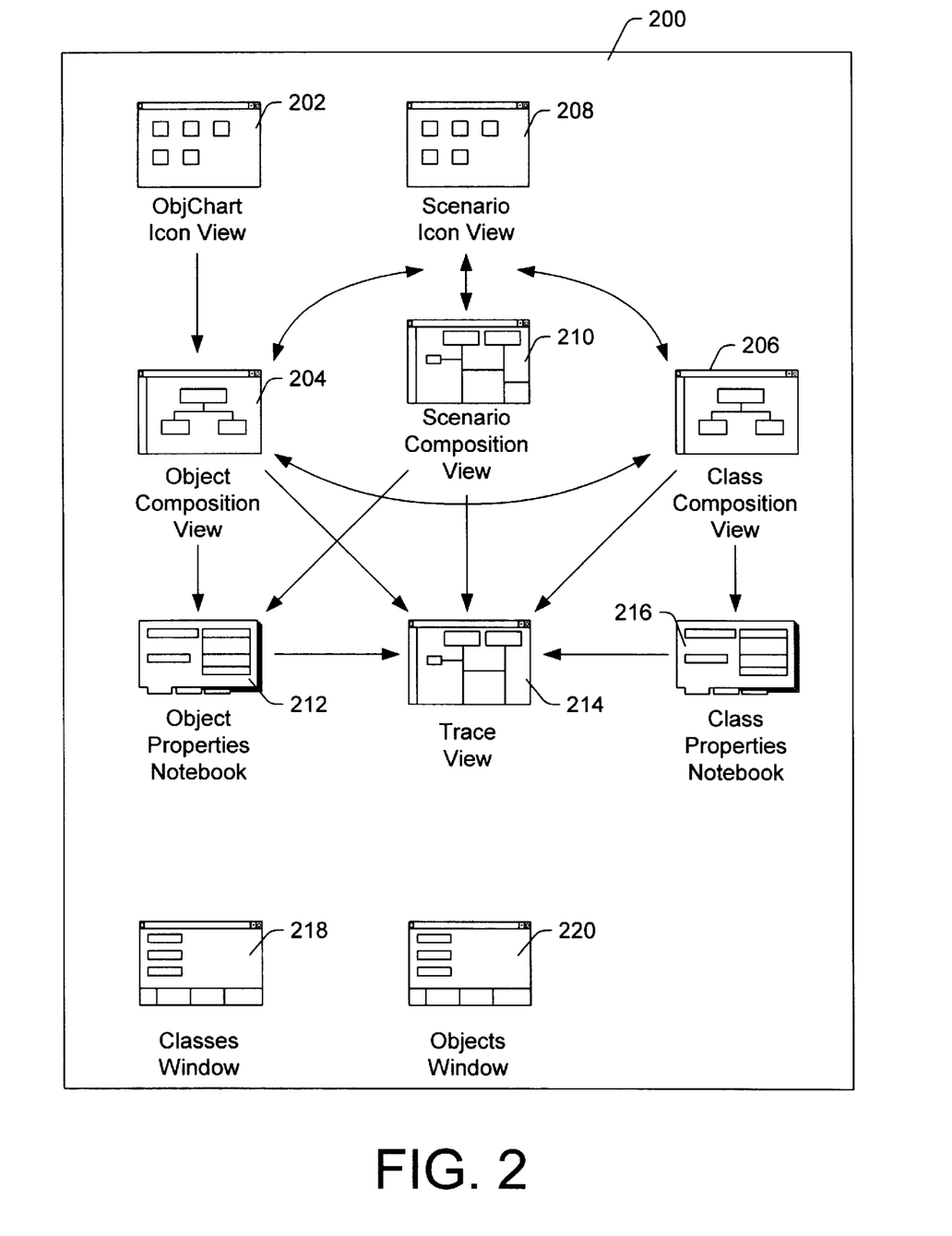
FIG. 2 shows a number of different windows or views in a graphical user interface (GUI) displayed on a monitor of the computer by the modeling tool of the present invention.

FIG. 2 shows a number of different windows or views in a graphical user interface (GUI) 200 displayed on a monitor of the computer 102 by the present invention, wherein these views are used to interact with the user in the construction of an object hierarchy 114 or its component parts. The GUI 200 includes a number of different views, including an ObjChart® Icon View 202, an Object Composition View 204, a Class Composition View 206, a Scenario Icon View 208, a Scenario Composition View 210, an Object Properties Notebook 212, a Trace View 214, a Class Properties Notebook 216, a Class Window 218, and an Object Window 220. Each of these views 202–220 may comprise one or more observer objects 116, or alternatively, a component part of a single observer object 116.

The notification manager 110 transparently maps functions performed on the object hierarchy 114 (i.e., calls or requests to modify the observed objects 112 in the object hierarchy 114) into functions performed on observer object 116 (i.e., calls or requests to notify the observer objects 116). In response to such notifications, the observer object 116 can perform callbacks or functions that interact with the object hierarchy 114 via the notification manager 110. The object hierarchy 114 itself does not have any knowledge of observer objects 116; all knowledge of how to notify the observer objects 116 of changes in the observed objects 112 in the object hierarchy 114 is encapsulated in the notification manager 110.

Figure 3:
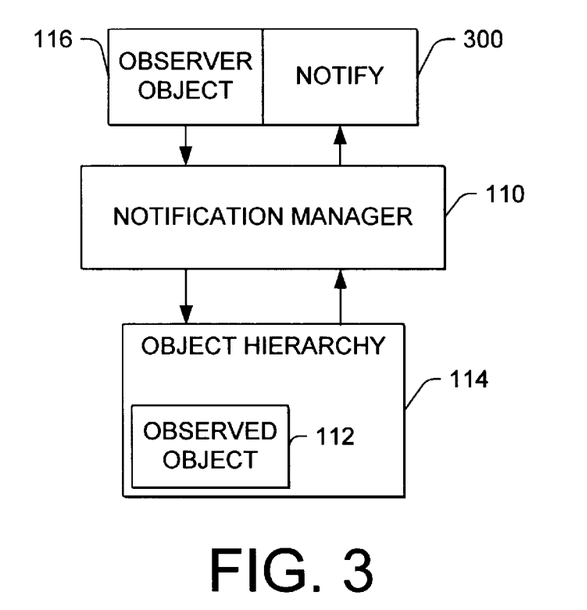
FIG. 3 is a block diagram illustrating the operation of the notification manager according to the present invention.

FIG. 3 is a block diagram illustrating the operation of the notification manager 110 according to the present invention. The notification manager 110 acts as an intermediary between the observer object 116 and the object hierarchy 114. The observer objects 116 register with the notification manager 110, so that they are notified when changes or modifications are made to the observed objects 112 in the object hierarchy 114. For example, if the observer object 116 comprises a user interface component, such as a view or a window, then this component is notified when a change is made to the observed objects 112 in the object hierarchy 114, so that the information displayed on a monitor attached to the computer 102 can be updated.

Notify functions 300 are defined in and used by the observer object 116 to obtain information about the object hierarchy 114. Thus, whenever an observed object 112 is added, deleted, or updated from the object hierarchy 114, the notification manager 110 invokes the appropriate notify function 300 in all correspondingly registered observer objects 116.

The notification manager 110 maintains a list of both observed objects 112 and observer objects 116, where each observed object 112 may have multiple observer objects 116. Further, observer objects 116 may be dynamically added to and removed from the observed objects 112.

Whenever a change is made to a specified observed object 112 in the object hierarchy 114, the notification manager 110 is informed. The notification manager 110 interfaces to the object hierarchy 114, accesses certain status information contained therein, determines which observed objects 112 have been modified, and then notifies the associated observer objects 116. The observer objects 116 monitoring the observed object 112 are notified in an unspecified order with information concerning the change. The observer objects 116 then respond accordingly to this notification in various ways, e.g., by updating the information in a view or window.

Figure 4:
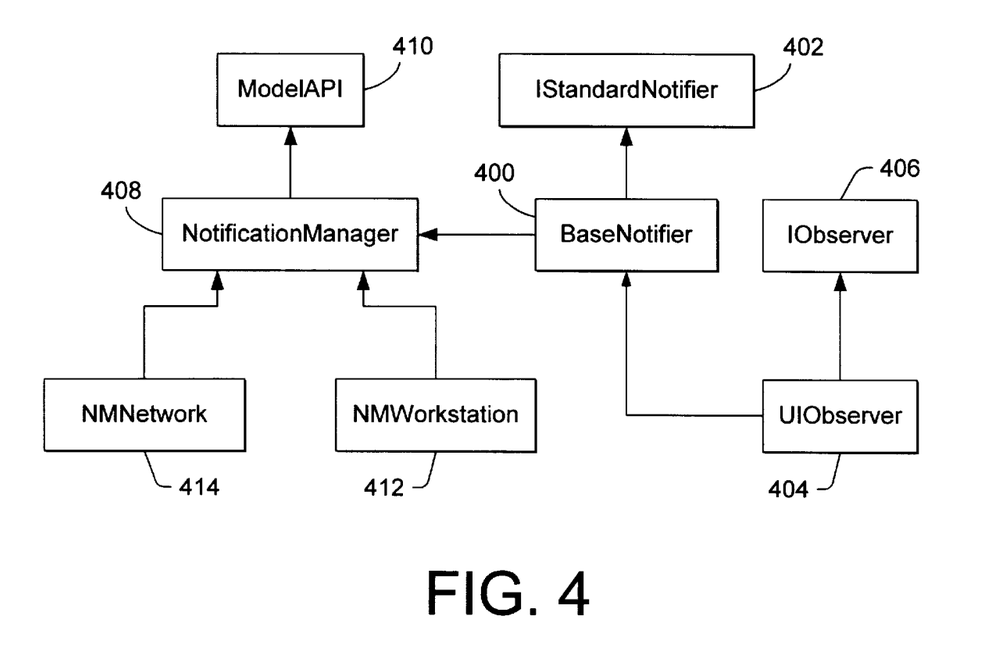
FIG. 4 is a block diagram illustrating the class definitions used to implement the present invention.

FIG. 4 is a block diagram illustrating the class definitions used to implement the present invention. The observed objects 112 in the object hierarchy 114 are instances of a BaseNotifier class 400, which inherits from a IStandardNotifier class 402. The IStandardNotifier class 402 is defined in IBM's ICLUI class library. The BaseNotifier class 400 provides the functions necessary for notifying the notification manager 110 when a change is made to an observed object 112 and for identifying the observer objects 116 that are registered with the observed object 112. The BaseNotifier class 400 supplements these functions with functions for adding (registering) and removing (de-registering) observer objects 116 with observed objects 112.

A UIObserver class 404 inherits from the BaseNotifier class 400 and maintains a list of observer objects 116 for an associated observed object. The UIObserver class 404 also inherits from IObserver class 406, which is defined in IBM's ICLUI class library. The IObserver class 406 class provides the functions for notifying the observer object 116 of changes made to the associated observed objects 112.

The NotificationManager class 408 provides the class definition for the notification manager 110. The NotificationManager class 408 inherits from a Model Application Programming Interface (ModelAPI) class 410, which provides the functions that allow the object hierarchy 114 to be accessed and/or manipulated. The ModelAPI class 410 includes the following functions:

APIset This function specifies values for properties of classes, objects, attributes, etc., in the object hierarchy 114.

APIadd This function creates a class, object, attribute, etc., for embedding or connecting to an existing class, object, attribute, etc. in the object hierarchy 114.

APIdel This function removes a class, object, attribute, etc., from the object hierarchy 114.

APIinstance This function creates an instance of a class in the object hierarchy 114.

APIlink This function creates a relationship between classes, objects, attributes, etc., in the object hierarchy 114.

APIcopy This function copies a class, object, attribute, etc., in the object hierarchy 114.

APIundo This function restores changes made to the object hierarchy 114.

The NotificationManager class 408 includes the following functions:

AddNotifier This function registers observer objects 116 with the notification manager 110.

DetachNotifier This function detaches or removes observer objects 116 with the notification manager 110.

These above functions all have a BaseHandle parameter, which is a logical reference to the observed object 112. When the notification manager 110 receives one of these calls, it determines which observed object 112 instantiated from the BaseNotifier class 400 corresponds to the BaseHandle parameter.

Finally, the NotificationManager class 408 also includes functions specific for two types of notification. A local or workstation version known as NMWorkstation class 412 is for systems where the object hierarchy 114 and the observer objects 116 are deployed on the same computer 102. A network version known as the NMNetwork class 414 allows distribution of the object hierarchy 114 across a network, with observer objects 116 residing on multiple computers 102.

Figure 5:
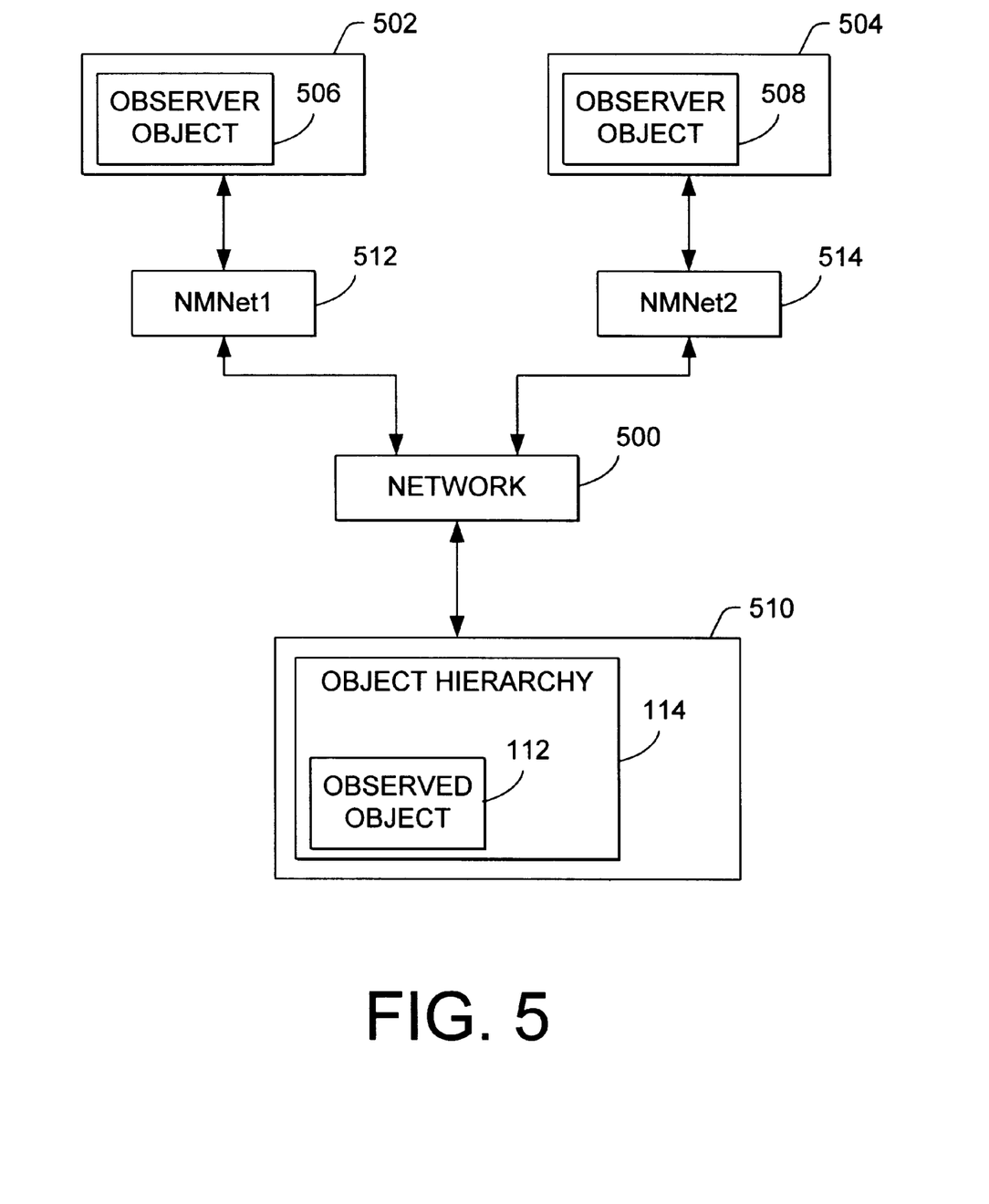
FIG. 5 is a block diagram further illustrating an exemplary network environment according to the present invention.

FIG. 5 is a block diagram further illustrating an exemplary network environment according to the present invention. Workstations 502 and 504 are attached to a network 500. Each workstation 502 and 504 has an observer object 506 and 508, which are user interface components. A server 510 maintains the object hierarchy 114. The observer objects 506 and 508 on each workstation 502 and 504 are kept dynamically synchronized of changes made to the object hierarchy 114 by the notification managers NMNet1 512 and NMNet2 514. When an observed object 112 in the object hierarchy 114 is modified, the notification managers NMNet1 512 and NMNet2 514 send the notifications via the network 500 to both observer objects 506 and 508 on the workstations 502 and 504.

Notification Manager Examples

FIGS. 6A–6D are illustrations of a user interface that provide a first example of the operation of the notification manager 110 according to the present invention.

Figure 6A:
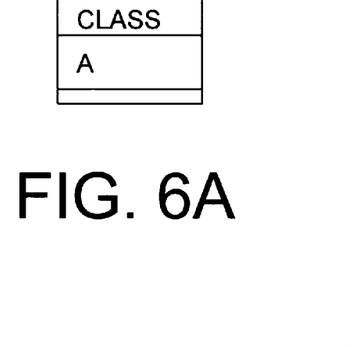
FIGS. 6A–6D are illustrations of a user interface that provide a first example of the operation of the notification manager according to the present invention.

There are two places where an attribute of a class can be displayed in the present invention: the Class Composition View and the Class Properties Notebook. The Class Composition View displays the attributes of a class. For example, FIG. 6A illustrates how an attribute "A" is displayed in the Class Composition View.

Figure 6B:
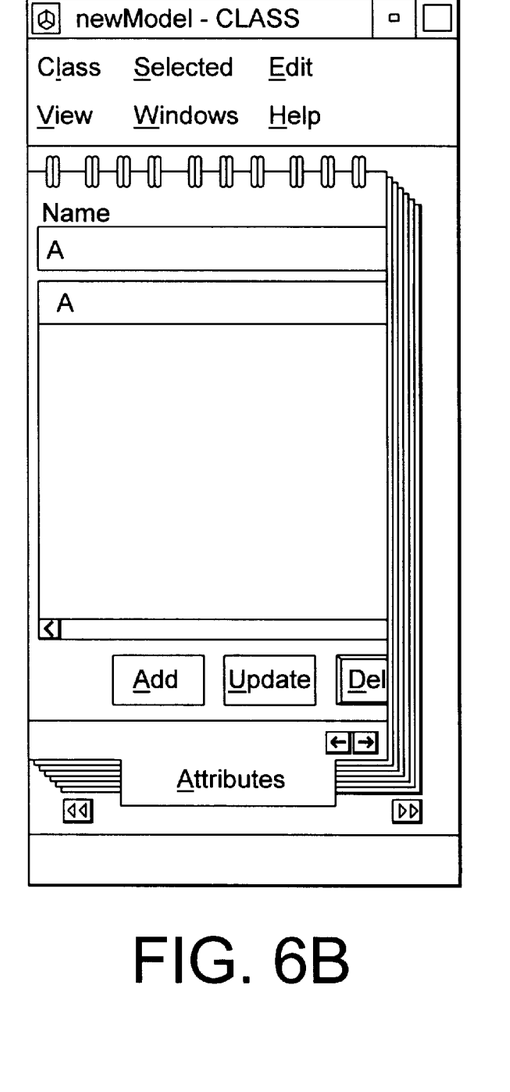

A user can double-click on the attribute "A" to get detailed information about the attribute, wherein the information is presented as an attribute page in a Class Properties Notebook, as illustrated in FIG. 6B.

Figure 6C:
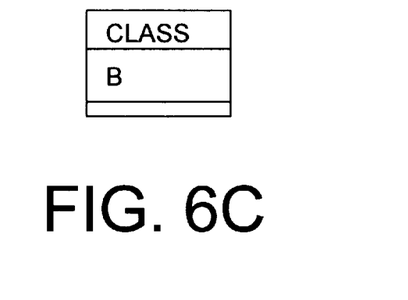
Figure 6D:
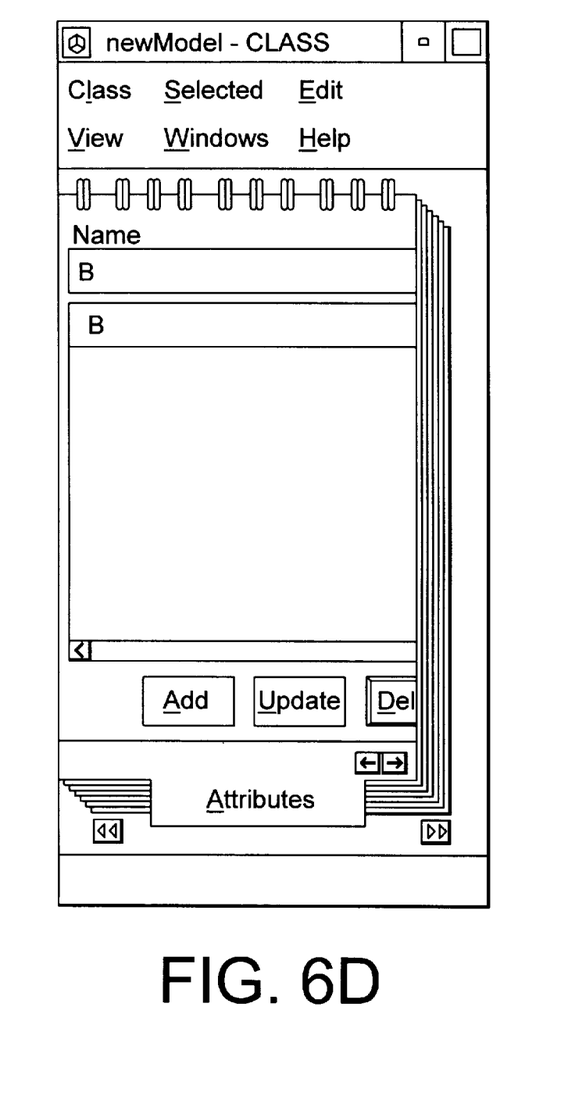

The notification manager 110 contains an observed object 112 instantiated from the BaseNotifier class 300 corresponding to attribute "A". The two views of the attribute in FIGS. 6A and 6B are observer objects 116 listed in the observed object 112. If the name of the attribute is changed to "B", then both observer objects 116, i.e., views, need to be updated to reflect the name change as shown in FIGS. 6C and 6D.

The observer objects 116 invoke the APIset function in the notification manager 110 to change the name of the attribute to "B". The notification manager 110 then invokes the APIset function in the object hierarchy 114 to change the name of the attribute in the object hierarchy 114. At this point, the notification manager 110 must notify the observer objects 116 associated with the observed object 112 of the changes. The notification manager 110 first identifies the observed object 112, which is an instantiation of the BaseNotifier class 300, and invokes a function of the observed object 112 provided by the BaseNotifier class 300 to notify all observer objects 116 registered with the observed object 112 that the attribute A now has the name of "B". This notification occurs by the observed object 112 invoking a function of the observer objects 116 provided by the UIObserver class 306.

When the observer objects 116 instantiated from the UIObserver class 306 receives the function call from the observed object 112 instantiated from the BaseNotifier class 300, they determine that a "set" operation was performed on an attribute name and therefore invoke a NotifySetName function.

In this way, both observer objects 116 of the attribute (the two views in FIGS. 6A and 6B) receive the appropriate notification via the NotifySetName function of the change to the attribute.

Figure 7:
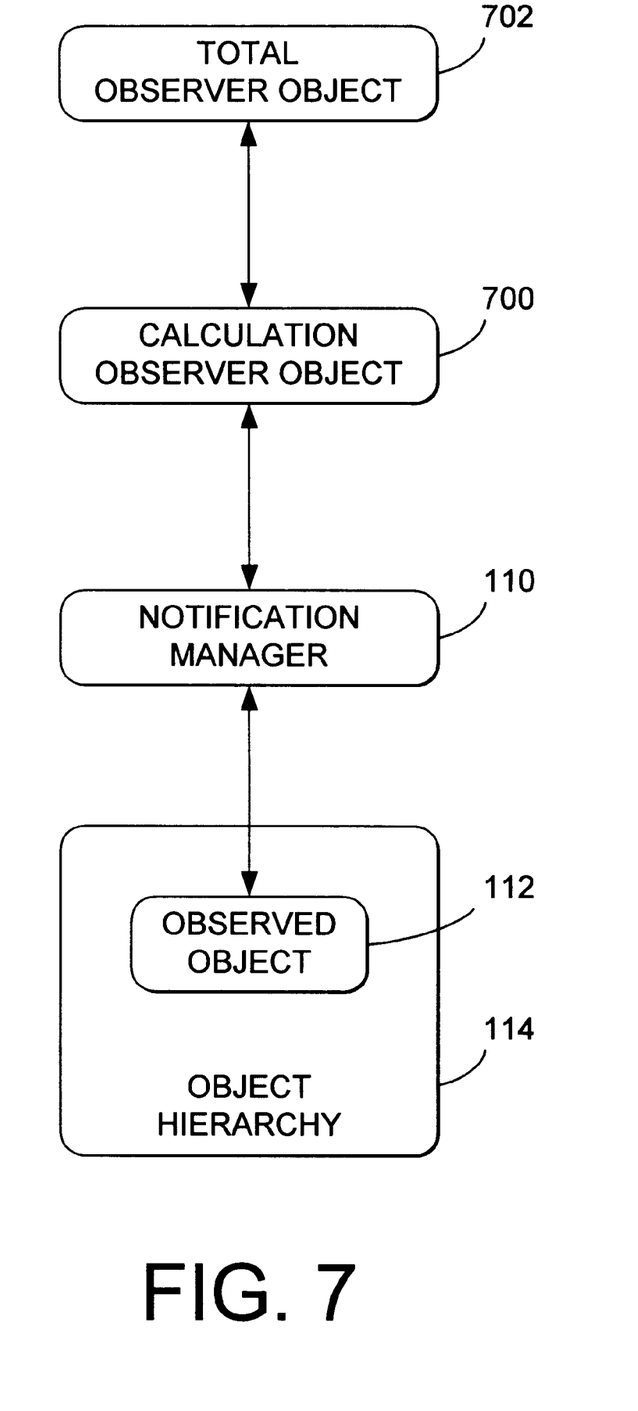
FIG. 7 is a block diagram that provides a second example of the operation of the notification manager according to the present invention.

FIG. 7 is a block diagram that provides a second example of the operation of the notification manager 110 according to the present invention. This example allows complex calculations to be abstracted into two parts, a calculation observer 700 and a total observer 702. The calculation observer object 700 is an observer object 116 of the set of purchase order observed objects 112 in the object hierarchy 114, with the total observer object 702 interested in displaying just the total cost of the purchase orders. The total observer object 702 needs notification whenever the total changes, a property based on many observed objects 112 in the object hierarchy 114. The calculation observer object 700 encapsulates the calculation so that it may be shared by the total observer object 702 rather than requiring the total observer object 702 to observe every purchase order observed object 112. In this sense, the calculation observer object 700 is also an observed object 112.

Conclusion

This concludes the description of the preferred embodiment of the invention. The present invention discloses a method, apparatus, and article of manufacture for notification in an object-oriented system. The system includes observed objects in an object hierarchy, a notification manager, and observer objects. The notification manager determines when a change is made to one of the observed objects in the object hierarchy and then notifies an associated observer object of the change.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of notification in an object-oriented system, comprising the steps of:
   (a) storing an object hierarchy in a computer, wherein the object hierarchy includes one or more observed objects;
   (b) registering an observer object with a notification manager so that the observer object is notified when changes are made to the observed objects;
   (c) determining when a change is made to one of the observed objects in the object hierarchy stored in the computer;
   (d) informing the notification manager of the change made to the observed object;
   (e) notifying the observer object via the notification manager of the change made to one of the observed objects in the object hierarchy stored in the computer, wherein the observed object has no knowledge of the observer object.

2. The method of claim 1, wherein the observer object is a user interface component selected from a group comprising a view and a window.

3. The method of claim 1, further comprising the step of receiving commands from the observer object to access and modify the observed object in the object hierarchy.

4. The method of claim 1, wherein the determining and notifying steps further comprise the step of transparently mapping functions performed on the object hierarchy into functions performed on the observer object.

5. The method of claim 4, wherein the transparent mapping step comprises the steps of mapping requests to modify the observed objects in the object hierarchy into functions requests to notify the observer objects.

6. The method of claim 1, wherein the registering step further comprises the step of maintaining a record of associated observer objects with each observed object.

7. The method of claim 1, further comprising the step of completing the change to the observed object before notifying the observer object.

8. A computer-implemented object-oriented system, comprising:
   a computer storing an object hierarchy, wherein the object hierarchy includes one or more observed objects;
   an observer object, stored in the computer;
   notification manager means, performed by the computer, for determining when a change is made to one of the observed objects in the object hierarchy stored in the computer and for notifying the observer object of the change made to one of the observed objects in the object hierarchy stored in the computer, wherein the observed object has no knowledge of the observer objects.

9. The apparatus of claim 8, wherein the observer object is a user interface component selected from a group comprising a view and a window.

10. The apparatus of claim 8, wherein the notification manager means further comprises means for receiving commands from the observer object to access and modify the observed object in the object hierarchy.

11. The apparatus of claim 8, wherein the notification manager means further comprises means for transparently mapping functions performed on the object hierarchy into functions performed on the observer object.

12. The apparatus of claim 11, wherein the means for transparently mapping comprises means for mapping requests to modify the observed objects in the object hierarchy into functions requests to notify the observer objects.

13. The apparatus of claim 8, wherein the notification manager means further comprises means for registering the observer objects with the observed objects, so that the observer objects are notified when changes are made to the observed objects.

14. The apparatus of claim 13, wherein the means for registering further comprises means for maintaining a list of associated observer objects with each observed object.

15. The apparatus of claim 8, further comprising means for completing the change to the observed object before notifying the observer object.

16. An article of manufacture comprising a program storage medium readable by a computer having a memory, the medium tangibly embodying one or more programs of instructions executable by the computer to perform method steps for notification in an object-oriented system, the method comprising the steps of:
   (a) storing an object hierarchy in the computer, wherein the object hierarchy includes one or more observed objects;
   (b) registering an observer object with a notification manager so that the observer object is notified when changes are made to the observed objects;
   (c) determining when a change is made to one of the observed objects in the object hierarchy stored in the computer;
   (d) informing the notification manager of the change made to the observed object;
   (e) notifying an observer object of the change made to one of the observed objects in the object hierarchy stored in the computer,
      wherein the observed object has no knowledge of the observer object.

17. The method of claim 16, wherein the observer object is a user interface component selected from a group comprising a view and a window.

18. The method of claim 16, further comprising the step of receiving commands from the observer object to access and modify the observed object in the object hierarchy.

19. The method of claim 16, wherein the determining and notifying steps further comprise the step of transparently mapping functions performed on the object hierarchy into functions performed on the observer object.

20. The method of claim 19, wherein the transparent mapping step comprises the steps of mapping requests to modify the observed objects in the object hierarchy into functions requests to notify the observer objects.

21. The method of claim 16, wherein the registering step further comprises the step of maintaining a list of associated observer objects with each observed object.

22. The method of claim 16, further comprising the step of completing the change to the observed object before notifying the observer object.

* * * * *